(12) United States Patent
Matsunaga (10) Patent No.: US 9,776,197 B2
(45) Date of Patent: Oct. 3, 2017

(54) PRODUCTION OF TAMARI SOY SAUCE

(71) Applicant: San-J International, Inc., Richmond, VA (US)

(72) Inventor: Masayoshi Matsunaga, Richmond, VA (US)

(73) Assignee: San-J International, Inc., Richmond, VA (US)

( * ) Notice: Subject to any disclaimer, the term of this patent is extended or adjusted under 35 U.S.C. 154(b) by 12 days.

(21) Appl. No.: 14/859,276

(22) Filed: Sep. 19, 2015

(65) Prior Publication Data

US 2016/0008828 A1    Jan. 14, 2016

Related U.S. Application Data (62) Division of application No. 14/261,311, filed on Apr. 24, 2014, now Pat. No. 9,463,480.

(51) Int. Cl.
*B05B 3/06* (2006.01)
*B05B 1/20* (2006.01)
(Continued)

(52) U.S. Cl.
CPC ............. *B05B 3/06* (2013.01); *A23L 27/50* (2016.08); *B05B 1/20* (2013.01); *B05B 15/065* (2013.01); *A23V 2002/00* (2013.01)

(58) Field of Classification Search
CPC ........... B05B 3/06; B05B 1/20; B05B 15/065; A23L 1/238426/44
See application file for complete search history.

(56) References Cited

U.S. PATENT DOCUMENTS

| 7,790,208 B2 | 9/2010 | Orimo et al. |
| 2005/0037452 A1* | 2/2005 | Deblois .................. C12M 23/20 435/41 |

(Continued)

FOREIGN PATENT DOCUMENTS

| JP | S50-154496 | 12/1975 |
| JP | 2006-050968 | 2/2006 |
| JP | 2007-289143 A | 11/2007 |

OTHER PUBLICATIONS

Kenzo Miyata et al., "The recent production method of Tamari Soy Sauce", Journal of the Brewing Society of Japan, vol. 64, No. 2, p. 148-152, Feb. 1969, Japan, (English summary attached on p. 1).

(Continued)

*Primary Examiner* — Hamid R Badr
(74) *Attorney, Agent, or Firm* — Masuvalley & Partners (57) ABSTRACT

Present invention enables to mass-produce rich-taste tamari soy sauce with reasonable costs. First step: Moisturizing soybeans. Second step: Steaming the moisturized soybeans. Third step: Shaping the steamed soybeans into nuggets. Fourth step: Mixing a soy flour and seed koji. Fifth step: Putting the mixture on the nuggets. Sixth step: Incubating the nuggets. Seventh step: Putting the incubated nuggets in salt water. Eighth step: Fermenting the nuggets in the salt water. Ninth step: Pressing moromi (solid component of the fermented product). Tenth step: Settling the liquid obtained by pressing the moromoi. Eleventh step: Optionally filtrating raw tamari soy sauce with a reverse osmosis membrane. Twelfth step: Adjusting concentrations of some constituents of the raw tamari soy sauce. Thirteenth step: Pasteurizing the raw tamari soy sauce. Fourteenth step: Settling the pasteurized tamari soy sauce. Fifteenth step: Filtering the supernatant. Sixteenth step: Bottling the tamari soy sauce.

7 Claims, 8 Drawing Sheets

(51) Int. Cl.
*B05B 15/06* (2006.01)
*A23L 1/238* (2006.01)
*A23L 27/50* (2016.01)

(56) References Cited

U.S. PATENT DOCUMENTS

2009/0258110 A1    10/2009  Sato
2010/0261242 A1*   10/2010  Harvey .................. C12M 21/04
                                                           435/161
2010/0278969 A1    11/2010  Tobe et al.

OTHER PUBLICATIONS

"Machida no ichi", http://machidanoichi.machida-cci.or.jp/companies/2619/view/company_information_id:278, (English summary attached on p. 1).

Toru Takada et al., "Test Report for the production of Tamari Soy Sauce using defatted soybean", Journal of the Brewing Society of Japan, vol. 66, No. 6, p. 572-578, Jun. 1971, Japan, (English summary attached on p. 1).

Haruo Kimura, "Current Situation of Tamari Soy Sauce production", Journal of The Brewing Society of Japan, vol. 71, No. 10, p., Oct. 1976, Japan, (English summary attached on p. 1).

"Living Machida-Sagami", http://mrs.living.jp/machisaga/town_gourmet/article/1372635 (English summary attached on p. 1).

"Reason for submission" Disclosure documents filed in Japanese Patent Application No. 2015-18997, submitted on Mar. 10, 2016, total 13 pages.

Third-Party Submission dated Mar. 11, 2016 (mailed to the applicant's representative in Japan on Apr. 15, 2016) in corresponding Japanese Application No. JP2015-018997, with human and machine translations, 29 pages.

Maki, "Basics: Japanese soy sauce—all you need to know (and then some)" published on Just Hungry (http://justhungry.com), Aug. 24, 2012).

"What is Tamari?" published on home page www.san-j.com, 2011.

\* cited by examiner

PRODUCTION OF TAMARI SOY SAUCE

This application claims priority under 35 U.S.C. §120 and §121 as a divisional of U.S. non-provisional patent application Ser. No. 14/261,311, filed Apr. 24, 2014, entitled "Production of Tamari Soy Sauce."

TECHNICAL FIELD

The present invention relates to a production of tamari soy sauce, which is one type of soy sauce that adds savory tastes and flavors to a variety of foods and dishes.

BACKGROUND OF THE INVENTION

Soy sauce, or shoyu is one of the most traditional and popular condiments in Japanese cuisine. In the United States, it is getting popularity even in the culinary scenes outside of Asian foods. As opposed to its name 'soy sauce', traditional Japanese soy sauce is made from half soybeans and half wheat, which means that the soy sauce is made from a mixture of usually 50% soy and 50% wheat. This composition of the ingredients makes it difficult for gluten intolerant people to enjoy the adorable taste of soy sauce. There are currently over two million people in the United States who are intolerant to gluten. It is sad that they cannot enjoy the savory taste of soy sauce.

There is one kind of soy sauce in Japan, which is called tamari-shoyu in Japanese,—tamari soy sauce translated into English. Tamari soy sauce is distinct from popular standard soy sauce in that little or no wheat is used for its production. Particularly the one that contains no wheat is suitable to serve to the gluten intolerant people to have them enjoy the traditional Japanese taste.

Traditionally, whole soybeans have been used to produce the tamari soy sauce. However, because of the high price of soybean, it is not easy to provide the tamari soy sauce to the consumers with a reasonable price. Therefore, an alternative approach is necessary to provide a reasonable price of tamari soy sauce. One choice for this is to use a processed soybean such as defatted soybean as an ingredient. However, the inventors found it difficult to produce the tamari soy sauce from the defatted soybean.

To produce the tamari soy sauce, it is necessary to form the steamed soybeans into a nugget shape, which is called misodama in Japanese. However, the defatted soybean could not be shaped into the nugget. When a small amount of wheat flour or barley flour was added to the defatted soybean, the shapability of the soybean was greatly improved. However, this approach would not lead the inventors to achieve their goal that is to provide a tamari soy sauce to gluten intolerant people with a reasonable price.

Soy sauce including tamari soy sauce generally contains lots of salt. Lately, there are a lot of health-oriented people, and some of them have demanded a tamari-soy sauce that contains a lower amount of salt. Vacuum concentration is an old-fashioned way of reducing the salt content in the soy sauce. However, the inventors have observed that the vacuum concentration reduces savory flavors of the tamari soy sauce. Lately, electrodialysis is becoming popular to reduce the salt content of soy sauce. However, the inventors disappointedly found that the desalinization by electrodialysis also decreases the thick and deep taste of tamari soy sauce.

To produce the tamari soy sauce, it is necessary to ferment the soy nuggets. In this process, the soy nuggets are put into salt water. There, the soy nuggets float on the salt water instead of sinking in the salt water. There is also an occasion in which not much salt water is added in the tank so that the height of the salt water is lower than the heights of the soy nuggets. Therefore, some portion of the soy nugget is usually exposed in the air, and this portion dries as time goes by. To prevent this, traditionally a craftsman has manually poured the salt water onto the soy nugget. This process is called kumikake in Japanese. However, this work is not practical for the mass production of tamari soy sauce. Therefore, an efficient alternative approach is necessary.

SUMMARY OF THE INVENTION

To mass-produce the rich-taste tamari soy sauce with reasonable costs, the inventors have made various improvements in many steps of the entire production process. Furthermore, the inventors also have improved the production equipment to efficiently produce the exquisite tamari soy sauce in mass scale. Now, both the regular and low-salt gluten-free tamari soy sauces are served to the consumers with reasonable prices.

BRIEF DESCRIPTION OF THE DRAWINGS

FIG. 4B is that detailed numerals are added in FIG. 4B.

DETAILED DESCRIPTION OF THE INVENTION

Embodiments of the present invention are described with the accompanying drawings. The ensuing description is not intended to limit the scope of the invention. Rather, preferred exemplary embodiments are provided for those skilled in the art to enable to implement the invention. It is noted that the present invention may be embodied in different forms without departing from the spirit and scope of the invention as set forth in the appended claims.

Below, the embodiments and examples of the present invention are explained in detail with the following sections:

§1. Embodiment of Tamari Soy Sauce Production
   §1.1 Overview of the Tamari Soy Sauce Production
   §1.2 Details of the Tamari Soy Sauce Production
§2. Examples of the Tamari Soy Sauce Production
   §2.1 Shapability of the Defatted Soybean
   §2.2 Production of the Raw Tamari Soy Sauce
   §2.3 Desalination of the Raw Tamari Soy Sauce
   §2.4 Completion of the Raw Tamari Soy Sauce Production
   §2.5 Evaluation of the Tamari Soy Sauce
§3. Embodiment of the Sprinkler Used for Fermenting the Soy Nugget
   §3.1 Overview of the Sprinkler
   §3.2 Detailed Structure of the Sprinkler
   §3.3 Action of the Sprinkler
   §3.4 Advantage of the Sprinkler §4. Embodiments of the Fermentation Equipment Used for Fermenting the Soy Nugget
    §4.1 First Embodiment
    §4.2 Second Embodiment
    §4.3 Third Embodiment

§1. Embodiment of Tamari Soy Sauce Production

§1.1 Overview of the Tamari Soy Sauce Production

Figure 1:
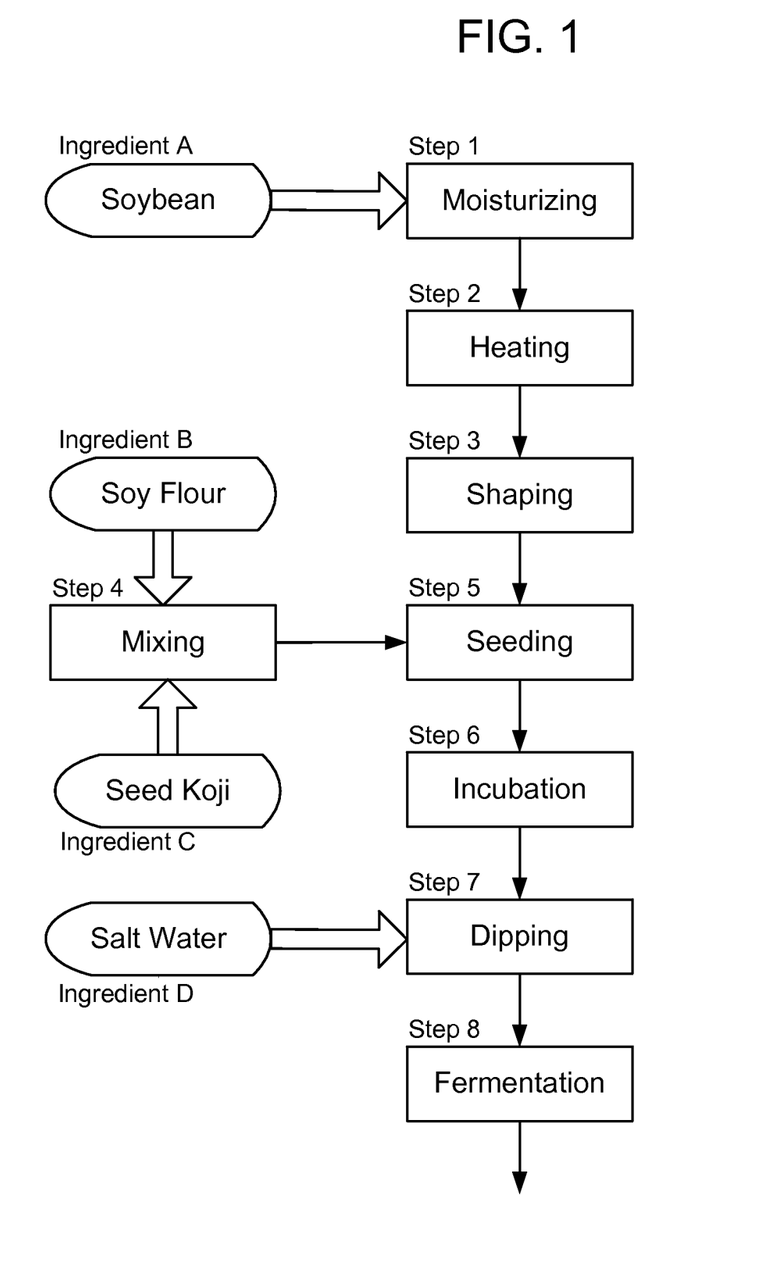
FIGS. 1 and 2 are process charts that explain the steps to produce tamari soy sauce.
Figure 2:
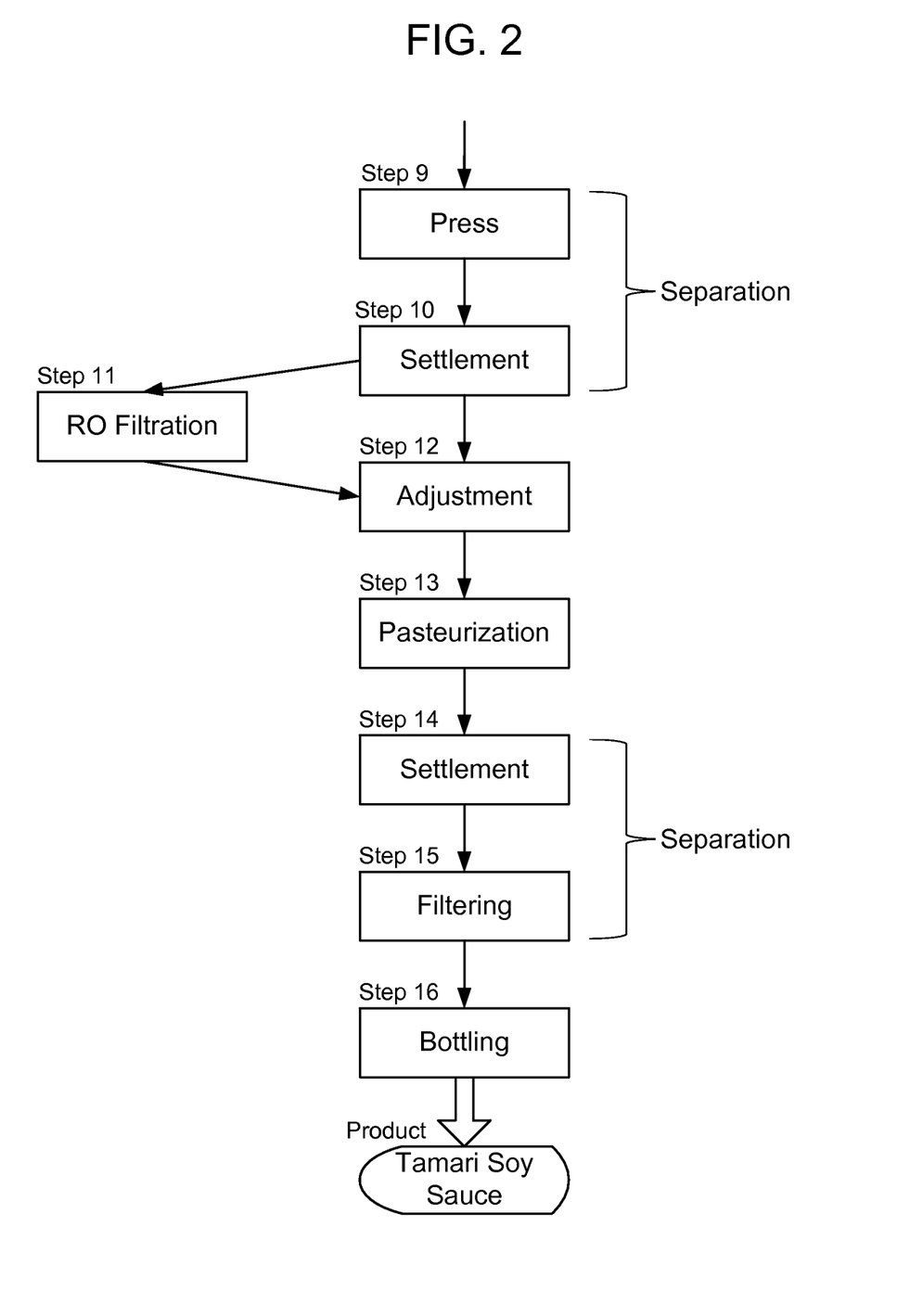

FIGS. 1 and 2 show brief procedure of producing the tamari soy sauce. As shown in these figures, the following ingredients are used for the production of tamari soy sauce:
   A: Soybean
   B: Soy Flour
   C: Seed Koji
   D: Salt Water
The steps for producing the tamari soy sauce are as follows:
   Step 1: Moisturizing the soybean A
   Step 2: Heating the moisturized soybean A
   Step 3: Shaping the heated soybean A into a nugget form
   Step 4: Mixing the seed koji C with the soy flour B
   Step 5: Seeding the mixture on the shaped soybean A
   Step 6: Incubating the seeded soybean A (koji making)
   Step 7: Dipping the koji (incubated soybean A) into the salt water D
   Step 8: Fermenting the dipped soybean A in the salt water D, resulting in moromi
   Step 9: Pressing the moromi (mixture of the liquid and solid components of the fermented product)
   Step 10: Settling the liquid component obtained by the fermentation and pressing
   Step 11: Filtrating the liquid component with a reverse osmosis membrane in the case of producing a low-salt tamari soy sauce
   Step 12: Adjusting the concentrations of some constituents of the liquid component
   Step 13: Pasteurizing the liquid component
   Step 14: Settling the tamari soy sauce to remove the sediment generated by the pasteurization
   Step 15: Filtering the supernatant of the liquid component
   Step 16: Bottling the filtered liquid component as the tamari soy sauce

§1.2 Details of the Tamari Soy Sauce Production

Prior to beginning the step 1, the soybean A is prepared as an ingredient of the tamari soy sauce. The soybean A is categorized into two kinds: soybean A1 and processed soybean A2. Examples of the soybean A1 are a whole soybean and peeled soybean whose skin is removed. Examples of the processed soybean A2 are soy flour, defatted soybean, extruder-processed soybeans, and okara (leftover after soy milk was squeezed from the soybean). For the production of traditional tamari soy sauce, the whole soybean is suitable. For the mass production of tamari soy sauce, the defatted soy bean is suitable because it is abundantly commercially available with a reasonable price. More importantly, as described below, the inventors found the way to mass-produce tasteful and flavorful tamari soy sauce from the defatted soy bean. The soybean A may be roasted. If necessary, rice flour or corn flour may be added to the soybean A.
Step 1: Moisturizing
   First, the soybean A is moisturized to produce the tamari soy sauce. The best way to moisturize the soybean A1 is to sit the soybean A1 in a water to let it soak the water. The temperature of the water is preferably at 10-80° C. It is preferable to moisturize the soybean A1 until its weight increases by 40-90%.
   When the processed soybean A2 is used, the processed soybean A2 is moisturized for example by adding a water to the processed soybean A2. When the defatted soybean is used, the inventors found that the amount of water added in this step is critical to be able to form the soy nugget in the later step. The inventors discovered that the defatted soybean can form the soy nugget only when the 70-100 liters of the water are added to 100 kilograms of the defatted soybean. Furthermore, the inventors found 75-90 liters of the water is optimal.
   The inventors also discovered that the nugget is more easily formed later if the defatted soybean and the water are mixed in a container that can rotate around a rotational axis extending in a horizontal direction. More specifically, first, the defatted soybean is put in the container. Then, the water is added to the container with the container rotating. These steps are suitably performed with a rotary-type cooker. The defatted soybean and the water may also be efficiently mixed in another type of container, which extends in a horizontal direction and contains a screw internally so that it can stir the mixture with this screw. More specifically, first, the defatted soybean is put in the container. Then, the water is added to the container with the screw rotating. These steps are suitably performed with a continuous cooker. It is preferable to supply the water, taking 0.2-0.5 minutes for 100 kilograms of the defatted soybean. Furthermore, the container is preferably kept rotating for 30-60 minutes with 0.7-1.0 rpm. Alternatively, the screw inside the container is preferably kept rotating for 1.0-15 minutes with 1.0-3.0 rpm. Below, when there is no necessity to distinguish the soybean A1 and the processed soybean A2, they are just called 'soybean A'.
Step 2: Heating
   The moisturized soybean A is heated for example by boiling or steaming. Steaming is a preferred way because it can prevent the soybean A from soaking excess water, which can impede the shaping of the nugget later. When the soybean A is steamed, it is preferred to steam it under a pressurized condition. When the rotary-type cooker is used, the preferred pressure for steaming is 0.05-0.1 MPa. Furthermore, the preferred temperature for heating is 110-120° C., and the preferred heating time is 30-90 minutes. Besides, it is preferable to rotate the container accommodating the soybean A while steaming to uniformly heat the soybean A. When the continuous cooker is used, the preferred pressure for steaming is 0.16-0.4 MPa. Furthermore, the preferred temperature for heating is 129-152° C., and the preferred heating time is 1-15 minutes. Besides, it is preferable to stir the soybean A by the screw. In these conditions, softness and stickiness of the soybean A become more suitable to shape the nugget.
   After steaming, the soybean A is cooled. One embodiment is to let the steamed soybean A at a room temperature for a while. The other embodiment is to forcibly cool the heated soybean A with a cooling device. The inventors found the latter better for good shapability of the soybean A. It is preferable to cool the heated soybean A to be below 40° C.
Step 3: Shaping
   After cooling the heated soybean A, the soybean A is shaped into a nugget or ball form, which is called misodama in Japanese. When the soybean A1 is used as the ingredient, the soybean A1 is mashed or ground. Then, the mashed or ground soybean A1 is formed into the nugget shape. When the processed soybean A2 is used, the cooled processed soybean A2 is formed into the nugget shape. The diameter of the nugget is preferably 2-4 centimeters.

Step 4: Mixing

Aside from making the soy nugget, seed koji C is prepared. The seed koji C is generally spores of fungus, fungus itself, or an ingredient containing a fungus or fungus spores. The seed koji C is called tane-koji in Japanese that is typically a mold, which is capable of carrying out the fermentation. Examples of the molds that are optimally used for tamari soy sauce production are *Aspergillus sojae, Aspergillus oryzae*, and *Aspergillus Tamarii*. These seed kojis C are commercially available.

The seed koji C is mixed with the soy flour B. Traditionally, wheat flour or barley flour is used to prepare for the seed koji C. However, these ingredients hamper the inventors' objective to produce gluten-free tamari soy sauce. Thus, the inventors sought the alternative ingredient that does not contain gluten, that does not hamper the fermentation and that adds better taste and flavor to the tamari soy sauce. The inventors found the soy flour the best. One problem was the attachment of the seed koji C to the soy nugget was not as excellent as when the wheat or barley flour was used. However, the inventors succeeded to grow the koji mold on the soy nugget well by optimizing the ratio of the seed koji C to the soy flour B as well as the moisturizing and steaming conditions of the soybean A (steps 1 and 2). According to the inventors' discovery, 0.5-2 kilograms of the seed koji C are good and 1-1.5 kilograms are the best for 100 kilograms of the soy flour B. As the soy flour B, both the raw soy flour and heated soy flour can be used. However, the heated soy flour is preferable, and roasted soy flour is particularly preferable. The roasted soy flour can be prepared by roasting the raw soy flour before mixing with the seed koji C. Other additives such as extruder-processed soybeans, rice flour, corn flour, or okara may be added to the soy flour B. Furthermore, extruder-processed soybeans, rice flour, corn flour, or okara can be used as a substitute of the soy flour B.

Step 5: Seeding

The seed koji C is seeded on the soy nugget. This is performed for example by putting the mixture of the seed koji C and the soy flour B on the soy nugget.

Step 6: Incubation

The seeded nugget is incubated in a room suitable for fermentation that is called koji-muro in Japanese. The temperature of the incubation is preferably set at 25-35° C., and its humidity is preferably set as 90-100%. It is preferable to incubate the nugget for 2-3 days. Thereby, a mold is grown at least on the surface of the nugget. This molded nugget is called koji in Japanese.

Step 7: Dipping

Figure 5:
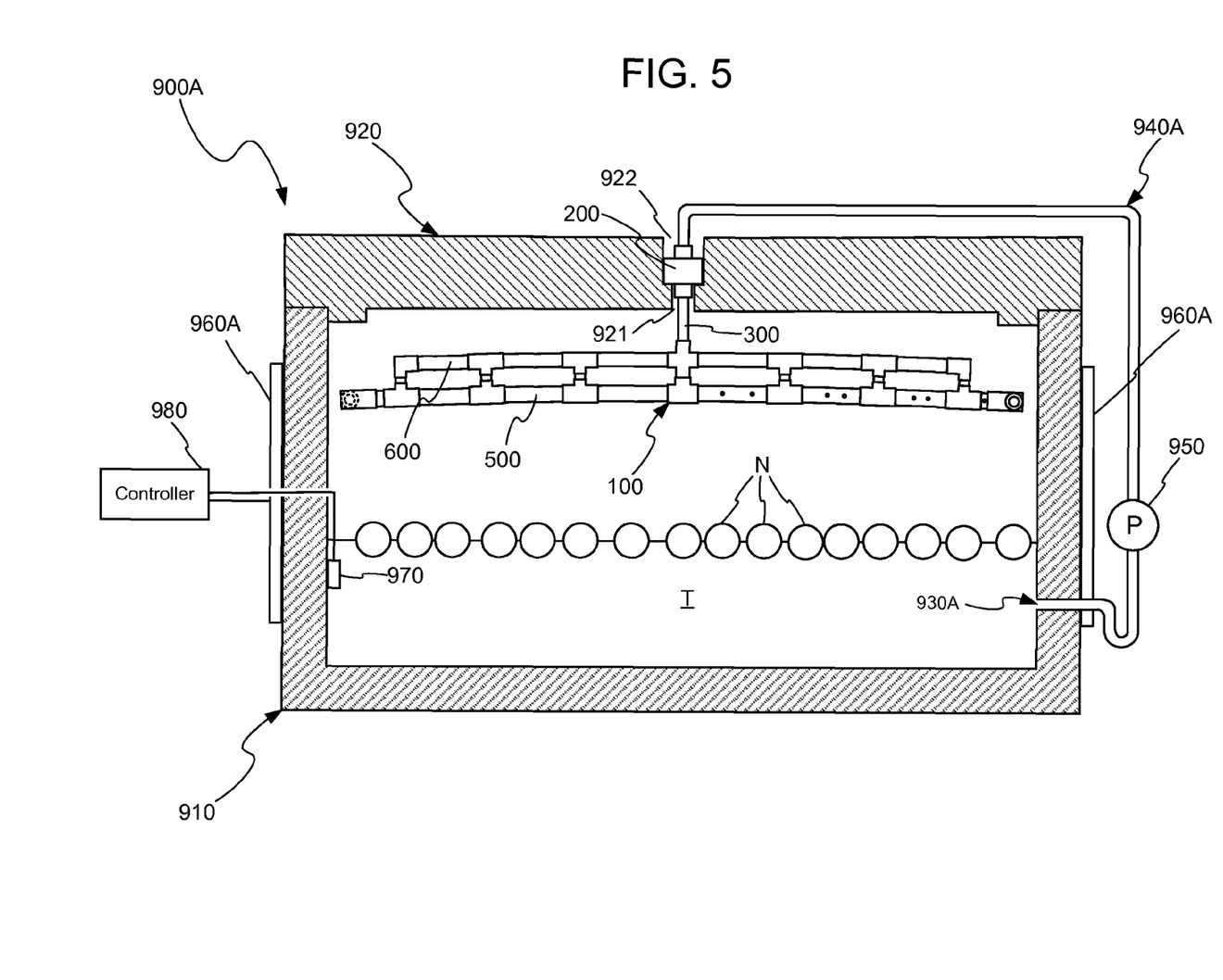
FIG. 5 is a schematic cross-sectional front view of the first embodiment of the fermentation equipment in which the sprinkler is installed.

The molded soy nugget is transferred in the salt water D. This process is done in a container such as fermentation tank as shown in FIG. 5. First, salt is provided in the container. Then, water is provided in the container, and the salt is dissolved in the water. Thereby, the salt water D is produced. Alternatively, the salt water D may be produced by diluting saturated salt water prepared beforehand with water. Lastly, the soy nugget is dumped in the salt water D. This mixture of the nugget and the salt water D is called moromi in Japanese. The concentration of the salt in the salt water D is preferably 19-25 weight %. The amount of the soy nugget provided in the salt water D is preferably 600-900 kilograms for 1000 liters of the salt water D. In this step or the next step, if necessary, lactic acid bacteria such as *Pediococcus halophiles, Pediococcus sojae, Lactobacillus rennini, Lactobacillus plantarum* and *Lactobacillus fructivorans* may be added to the salt water D. Furthermore, if necessary, yeast such as *Zygosaccharomyces rouxii* and *Candida versatilis* may also be added to the salt water D.

Step 8: Fermentation

Figure 4A:
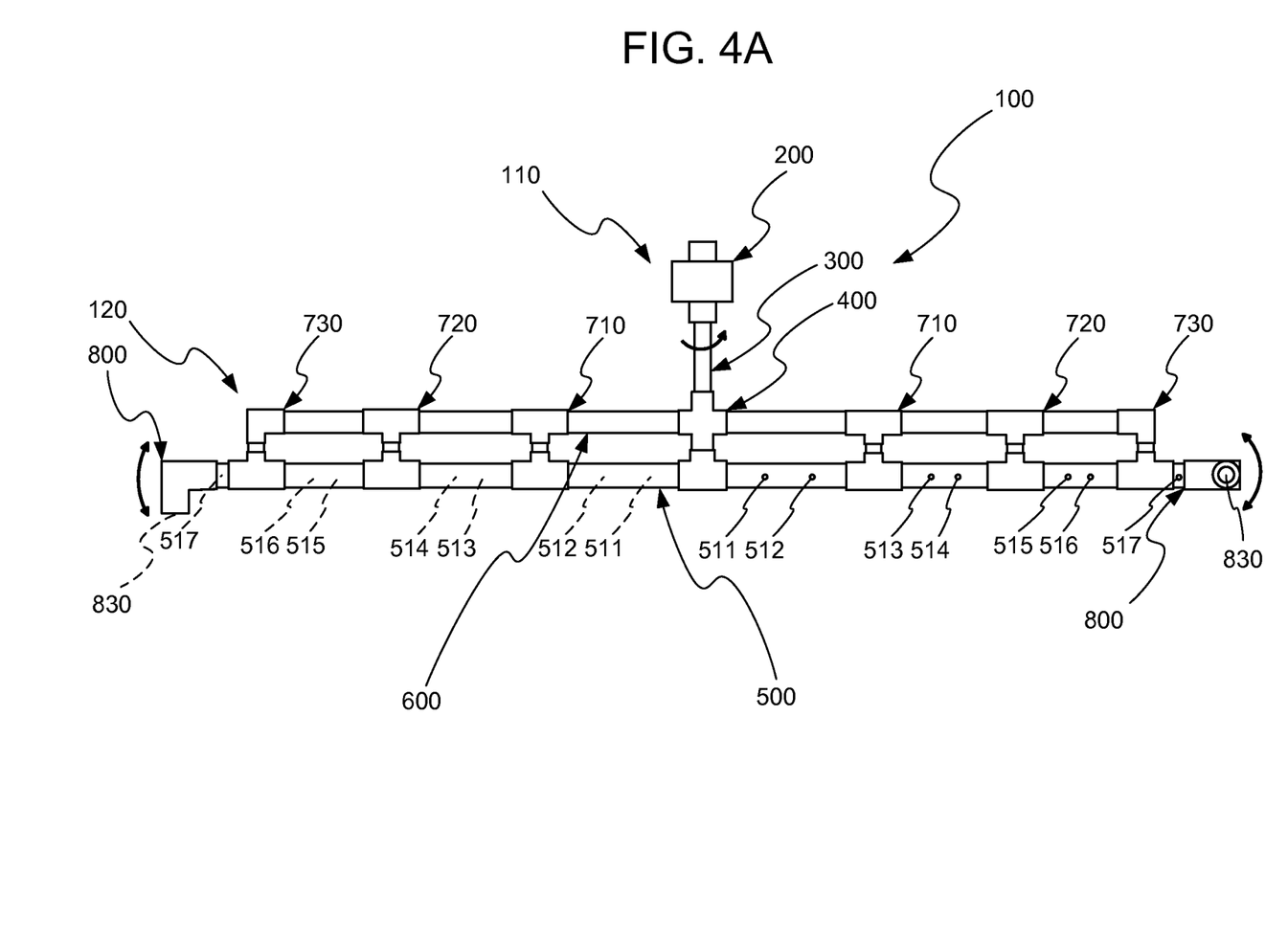
FIGS. 4A and 4B are a front view of a sprinkler used for fermentation of the ingredient to produce tamari soy sauce. The difference between FIG. 4A
Figure 6:
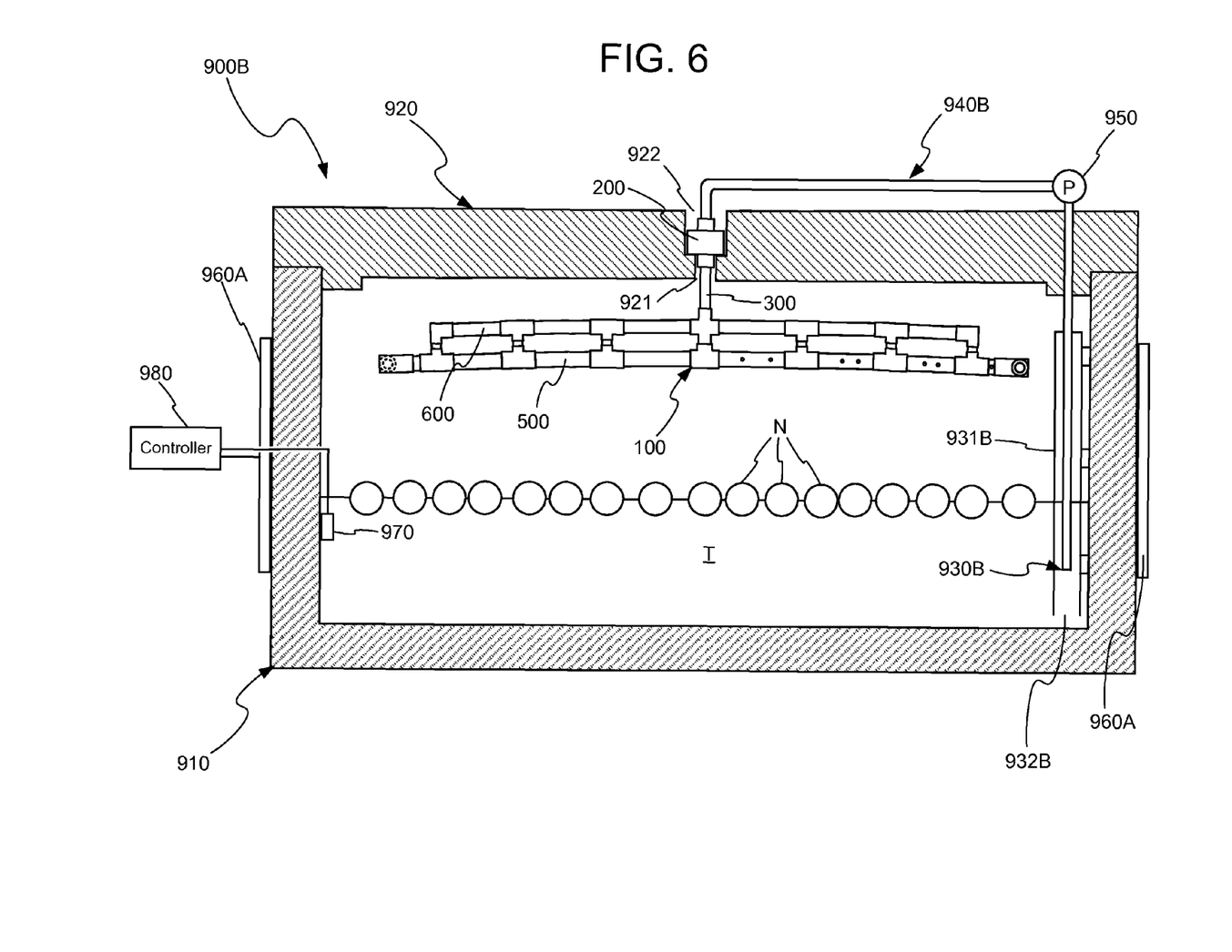
FIG. 6 is a schematic cross-sectional front view of the second embodiment of the fermentation equipment.
Figure 7:
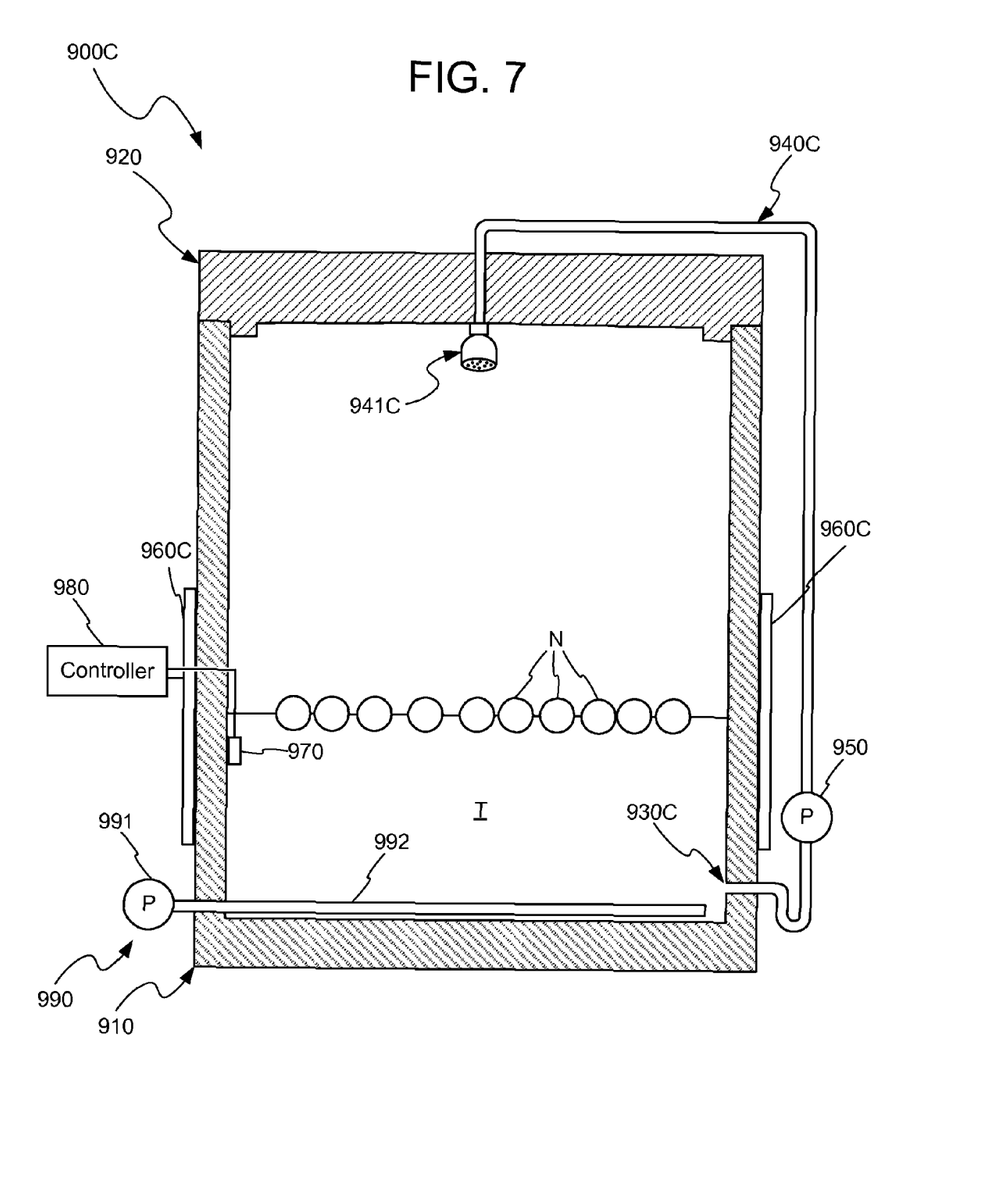
FIG. 7 is a schematic cross-sectional front view of the third embodiment of the fermentation equipment.

The molded soy nugget is fermented in the salt water D usually for 4-7 months. The fermentation is optimally done for example in the containers shown in FIGS. 5-7. Since the soy nugget floats on the salt water D, the upper portion of the soy nugget that is exposing to the air dries as time goes by. To prevent the soy nugget from being drying, it is necessary to periodically pour the salt water D onto the soy nugget. This work is called kumikake in Japanese. To efficiently moisturize the soy nugget, the inventors adapted a sprinkler as shown in FIG. 4A. With the sprinkler shown in FIG. 4A, the soy nugget is efficiently and uniformly moisturized. Thereby, the fermentation effectively progresses. It is preferable to sprinkle the salt water D onto the soy nugget once—5 times a day. It is also preferable to use $1/10$-$1/3$ of the salt water D in the container for one sprinkle. The inventors observed that the fermentation is facilitated with this condition particularly when the sprinkler and the container shown in FIGS. 5 and 6 are used for fermentation. Instead of the sprinkler, a shower such as the one shown in FIG. 7 may be used to moisturize the soy nugget. During the fermentation, air may be pumped to the salt water D continuously or intermittently to facilitate the stirring of salt water D. The container as shown in FIG. 7 is suitably used for this.

The inventors have observed that it is better that the fermentation temperature is not set constant from the beginning to the end of the fermentation process. Rather, it is better to change the fermentation temperature based on the stage of fermentation. In the early stage of fermentation such as beginning to first 0.5 months, the temperature of the salt water D is preferably set at 15-20° C. In the middle stage of fermentation such as 1 month to 4 month period, the temperature of the salt water D is preferably set at 30-35° C. In the late stage of fermentation such as 6 month period to the end, the temperature of the salt water D is preferably set at 27-30° C. In short, relatively low temperature is suitable in the early stage of fermentation, relatively high temperature is suitable in the middle stage of fermentation, and middle range temperature is suitable in the late stage of fermentation.

Step 9: Press

Once the fermentation is done, the liquid component of the fermented product is separated from the solid component. One preferred way to do so is pressing the moromi, which is a mixture of the fermented soy nugget and salt water D. First, moromi is collected from the fermentation tank and put into a cloth bag. Then, the moromi is pressed and the liquid is squeezed out from the soy nugget. All the separated liquid components are collected and combined.

Step 10: Settlement

Then, the collected liquid component is settled for example for 1-3 days at room temperature to sediment the insoluble components that came from the broken solid component of the fermented product. Then, the supernatant is collected. The separated liquid component is called kijouyu in Japanese. The kijouyu is a raw tamari soy sauce, which is already suitable for cooking. However, the following steps can be further performed to make the quality of tamari soy sauce more consistent and suitable for long-term storage.

Step 11: Reverse Osmosis (RO) Filtration

To produce a low-salt tamari soy sauce, this step is performed. For the production of the regular tamari soy sauce, this step is not necessary. Since the raw tamari soy sauce contains a high concentration of salt, it is necessary to desalinize the tamari soy sauce to make the reduced salt product. In the present invention, the desalinization is performed by reverse osmosis (RO) filtration. The inventors found the RO filtration the best method to desalinize the tamari soy sauce.

The traditional method to desalinize the soy sauce is vacuum concentration. However, the inventors have observed that the vacuum concentration reduces savory aroma of tamari soy sauce. This is considered because some small molecules that contribute to the flavor of tamari soy sauce evaporate and are lost during the vacuum concentration. Lately, electrodialysis is becoming popular to desalinize the regular soy sauce. Thus, the inventors also tested the electrodialysis to desalinize the tamari soy sauce. However, the result was still unsatisfactory. The tamari soy sauce desalinized by the electrodialysis still lacked the thick and deep taste of tamari soy sauce. This is probably because some large molecules contributing to the profound taste and aroma of tamari soy sauce stick to the dialysis membrane and are lost. In addition, because large current flows in the electrodialysis device, some parts of the device can be hot. This sometimes causes a bad smell inside the device, and the tamari soy sauce can capture this bad smell. Furthermore, some of small ionic organic molecules that contribute to the good taste of tamari soy sauce, particularly amino acids and their derivatives, may be also eluted to the eluate. On the contrary, the inventors found that the RO filtration preserves the savory aroma and thick and deep taste of tamari soy sauce much better.

The inventors found when the tamari soy sauce is passed along the RO membrane, relatively large amount of salt (sodium chloride) passes through the RO membrane with the water but other important constituents contributing to the good taste and flavor of tamari soy sauce, particularly nitrogen-containing ionic organic molecules, pass through the RO membrane less than sodium ion and chloride ion do. Furthermore, the large molecules that contribute to the savory taste and aroma of tamari soy sauce are well prevented from passing through the RO membrane. Therefore, the tamari soy sauce processed with the RO membrane still maintains the thick and deep taste of tamari soy sauce fairy well.

Figure 3:
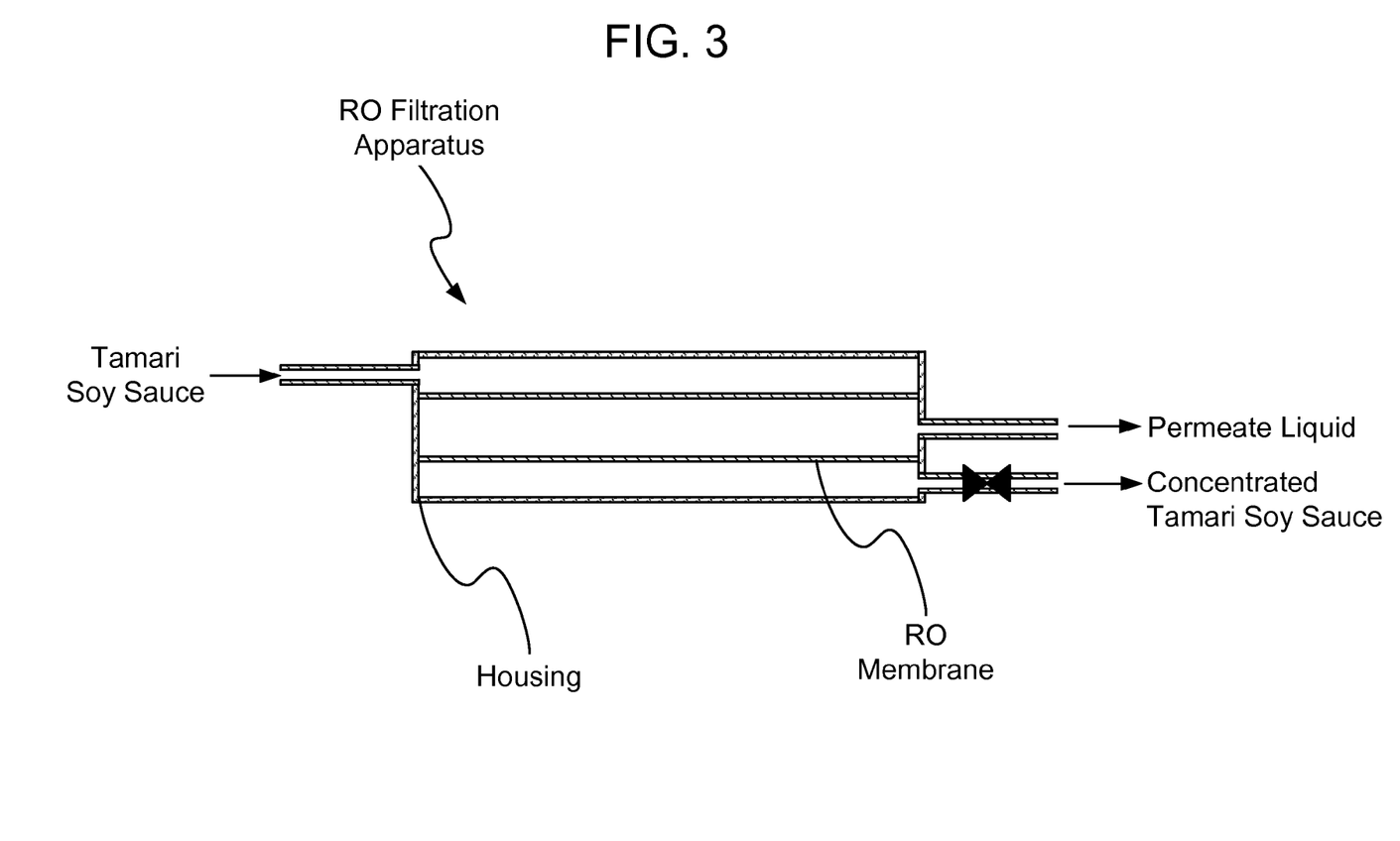
FIG. 3 is a schematic diagram of a setup of reverse osmosis membrane filtration for desalinization of tamari soy sauce.

As shown in FIG. 3, when the tamari soy sauce is supplied to an RO filtration apparatus, the tamari soy sauce flows outside of the tubular RO membrane. While the tamari soy sauce is flowing along the RO membrane, some amounts of water and salt pass through the RO membrane. However, many other important constituents contributing to the taste and flavor do not as much as salt does. Therefore, they are concentrated as the RO filtration process goes by. Then, the flow-through, the liquid that has not passed the RO membrane, is used for the further downstream process to produce the final product of tamari soy sauce. More specifically, the flow-through is diluted with water. Thereby, tamari soy sauce comes to contain reduced concentration of salt but contain other constituents with the concentration comparable to original tamari soy sauce. The pass-through, the liquid that has passed through the RO membrane, is collected as a waste or by-product. The by-product can be used for other purposes such as a new product or a salt water substitute.

It is preferable to perform the RO filtration so that the nitrogen concentration of the flow-through becomes 110-150% of that before the filtration. It is also preferable to perform the RO filtration so that the salt concentration of the flow-through becomes 75-95% of that before the filtration. Furthermore, it is preferable to perform the RO filtration so that the concentration ratio of nitrogen to salt of the flow-through becomes 120-175% of that before the filtration. In these conditions, the balance of the taste and flavor becomes the best after diluting the flow-through with water.

In this respect, the internal pressure of the RO filtration apparatus, which is the pump pressure of the tamari soy sauce to the RO membrane, is preferably set as 2.6-4.1 MPa. The temperature of the tamari soy sauce pumped to the RO membrane is preferably set to be 20-50° C. Besides, the pore size of the RO membrane is preferably 0.5-2 nanometers.

It is preferable that the flow-through is diluted with a diluent so that the nitrogen concentration becomes preferably 2.1-2.3% and the salt concentration becomes preferably 11-13%. The inventors found that the taste becomes most balanced within these ranges.

Step 12: Adjustment

Concentrations of some constituents of the liquid component of the fermented product are adjusted. Thereby, the taste and flavor of the product become consistent from lot to lot. Examples of the constituents whose concentrations are adjusted are salt and nitrogen. For example, some batch of the liquid component can have a higher salt concentration and some other batch can have a lower salt concentration. In this case, these two batches are blended to have a desired salt concentration. Likewise, when some batch has a higher nitrogen concentration and some other batch has a lower nitrogen concentration, these two batches are blended to have a desired nitrogen concentration. By these works, the qualities of tamari soy sauce become consistent from lot to lot. For example, the batches are blended so that the nitrogen concentration becomes preferably 2.1-2.3% and the salt concentration becomes preferably 15-17%. In other embodiment, salt or water may be added to the tamari soy sauce to adjust the concentration of its constituent.

Step 13: Pasteurization

The raw tamari soy sauce is pasteurized. This process is called hire in Japanese. For example, the raw tamari soy sauce is heated at 85-98° C. for 0.5-30 minutes. Thereby, all the microorganisms that have involved in the fermentation are killed, and the fermentation is completely stopped. Thus, the tamari soy sauce becomes suitable for a long-term storage. After pasteurizing, preservatives such as ethanol or other additives may be added to the tamari soy sauce.

Step 14: Settlement

By the pasteurization, insoluble components are generated in the tamari soy sauce. This is mainly because proteins in the tamari soy sauce are denatured by the heat and some of them become insoluble. To remove the insoluble components, the pasteurized tamari soy sauce is settled optimally for 3-5 days at room temperature to sediment the insoluble components. The inventors found that when at least 3 days are spent for settlement, the next filtering step is carried out much more smoothly. Before settlement, a precipitation agent or coagulant may be added to the tamari soy sauce. An example of the precipitation agent is silicon dioxide.

Step 15: Filtering

The supernatant of the settled tamari soy sauce is filtered. Thereby, the insoluble components are completely removed from the tamari soy sauce. Usually, regular soy sauce is filtered with a diatomite filter such as Celite® filter. However, the inventors found that the tamari soy sauce does not pass through the diatomite filter efficiently. Therefore, the inventors sought the alternative filter suitable for filtering the tamari soy sauce. They discovered that micro filtration membrane filter is optimal for filtering the tamari soy sauce.

The pore size of this filter is preferably 0.05-10 micrometers. In one embodiment, 4-5 days may be spent to filter 1 liter of tamari soy sauce.

Step 16: Bottling

The filtered tamari soy sauce is bottled. The bottled tamari soy sauce is shipped to the stores and consumers as a product. The final product of tamari soy sauce should preferably contain 2.1-2.3% of nitrogen and 15-17% of salt. The inventors found that the taste of tamari soy sauce becomes most profound when the salt and nitrogen concentrations are within these ranges.

§2. Examples of the Tamari Soy Sauce Production

§2.1 Shapability of the Defatted Soybean

Purchased defatted soybean was divided into 10 kg of batches. Then, the following respective amounts of water (20° C.) shown in Table 1 were added to the defatted soybean and mixed in a container rotating at 1.0 rpm for 40 minutes.

TABLE 1

Amounts of Water Added to the Defatted Soybean

| Batch | Defatted Soybean | Water |
|---|---|---|
| 1 | 10 kg | 5 liters |
| 2 | 10 kg | 6 liters |
| 3 | 10 kg | 7 liters |
| 4 | 10 kg | 8 liters |
| 5 | 10 kg | 9 liters |
| 6 | 10 kg | 10 liters |
| 7 | 10 kg | 11 liters |
| 8 | 10 kg | 12 liters |
| 9 | 10 kg | 13 liters |
| 10 | 10 kg | 14 liters |

Each batch of the watered defatted soybean was steamed at 118° C. under 0.08 MPa for 60 minutes. Then, the steamed defatted soybean was forcibly cooled to be 36° C. in 10 minutes. Then, the cooled defatted soybean was attempted to shape into approximately 2 cm sized nuggets. The result was as follows shown in Table 2.

TABLE 2

Shapability of the Defatted Soybean

| Batch | Defatted Soybean | Water | Shapability |
|---|---|---|---|
| 1 | 10 kg | 5 liters | Bad |
| 2 | 10 kg | 6 liters | Bad |
| 3 | 10 kg | 7 liters | Good |
| 4 | 10 kg | 8 liters | Excellent |
| 5 | 10 kg | 9 liters | Excellent |
| 6 | 10 kg | 10 liters | Good |
| 7 | 10 kg | 11 liters | Bad |
| 8 | 10 kg | 12 liters | Bad |
| 9 | 10 kg | 13 liters | Bad |
| 10 | 10 kg | 14 liters | Bad |

In the table, 'Bad' means the defatted soybean could not be formed into the nugget. 'Good' means the defatted soybean was formed into the nugget but the hardness or texture might not be optimal for the incubation and fermentation based on the inventors' experience. 'Excellent' means the defatted soybean was formed into the nugget and the hardness and texture were satisfactory for the fermentation.

§2.2 Production of the Raw Tamari Soy Sauce

The soy nuggets of batches 1, 2 and 7-10 were discarded, and the batches 3-6 were used for further works. 3 g of seed koji and 350 g of soy flour were mixed for one batch of the nuggets. The surfaces of the soy nuggets were dredges with this mixture. Then, the soy nuggets were incubated at 30° C. and in 95% humidity for 2 days. Thereby, the mold was grown on the nuggets, and koji was produced. However, the growth of the mold of batch 3 was smaller than the other batches.

15 l of 24.5% salt water was prepared for each batch. Then, the molded nuggets were put into the salt water. Then, the nuggets were fermented in the salt water for 6 months. In the first 0.5 months, the fermentation temperature was kept at 25° C., the 1-4 months at 33° C., and the 4 months to the end at 30° C. 200 ml of the fermenting salt water in the container was scooped and sprinkled on the nuggets once a day. During this process, a larger amount of the soy nuggets of batch 6 broke down and formed fragments.

After the fermentation, the fermented liquid was collected. Furthermore, moromi (fermented soy nuggets) were placed in a pressing apparatus and the liquid was squeezed out from the moromi. These collected and squeezed liquids were combined. Thereby, gluten-free raw tamari soy sauce was obtained. Average nitrogen concentration of the raw tamari soy sauce was 2.6%, average salt concentration was 16.5%, and the average concentration ratio of nitrogen to salt was 0.16.

§2.3 Desalination of the Raw Tamari Soy Sauce

The obtained raw tamari soy sauce was split into three in each batch. The first one third was desalinized by vacuum concentration. More specifically, the raw tamari soy sauce was concentrated by vacuum concentration until its volume became 60%, and thereby some amount of salt was deposited in the bottom and removed. Then, the concentrated raw tamari soy sauce was diluted with the drained water and alcohol so that the salt concentration became 12%. The second one third of the raw tamari soy sauce was desalinized by electrodialysis. More specifically, the raw tamari soy sauce was electrodialyzed with 2% salt water, which was served as a concentrate while the raw tamari soy sauce was served as a diluate, until the salt concentration of the raw tamari soy sauce became 12%.

The last one third of the raw tamari soy sauce was treated by an RO filtration apparatus (Manufacturer: Desal, Product name: DL80, Made of: aromatic polyamide, Cutoff: 150-300 dalton) with 2.8 MPa at 35° C. for 480 minutes. Thereby, the average nitrogen concentration of the raw tamari soy sauce became 3.0%, the average salt concentration became 15.5%, and the average concentration ratio of nitrogen to salt became 0.19. This raw tamari soy sauce was diluted with water so that salt concentration became 12%.

§2.4 Completion of the Raw Tamari Soy Sauce Production

All the reduced salt tamari soy sauce was pasteurized at 95° C. for 15 minutes. Then, the pasteurized tamari soy sauce was settled at a room temperature for 5 days. Then, the supernatant was separated from the pellet. Thereby, the final product of tamari soy sauce was obtained.

§2.5 Evaluation of the Tamari Soy Sauce

Tamari soy sauces of each batch and each desalinization method were evaluated by five tasters. Each tamari soy sauce was evaluated in two categories, taste and flavor with 5 ranked scores, where 1: Terrible, 2: Bad, 3: OK, 4: Good, and 5: Satisfactory. Then, the ranks were averaged. The results are shown in the below Table 3.

TABLE 3

Taste and Flavor of Produced Tamari Soy Sauce

| Batch | Desalinization Method | Taste | Flavor |
|---|---|---|---|
| 3 | Vacuum Concentration | 3.4 | 3.0 |
| 3 | Electrodialysis | 4.2 | 4.4 |
| 3 | RO Filtration | 4.4 | 4.6 |
| 4 | Vacuum Concentration | 3.8 | 3.2 |
| 4 | Electrodialysis | 4.4 | 4.6 |
| 4 | RO Filtration | 5.0 | 5.0 |
| 5 | Vacuum Concentration | 3.8 | 3.2 |
| 5 | Electrodialysis | 4.4 | 4.8 |
| 5 | RO Filtration | 5.0 | 5.0 |
| 6 | Vacuum Concentration | 3.6 | 3.0 |
| 6 | Electrodialysis | 4.4 | 4.6 |
| 6 | RO Filtration | 4.6 | 4.8 |

From the experiments, it was concluded that the RO filtration preserved the profound taste and flavor of tamari soy sauce better than the vacuum concentration and electrodialysis. Furthermore, it was also concluded that use of 8-9 l of water for 10 kg of the defatted soybean resulted in the most satisfactory taste and flavor.

§3. Embodiment of Sprinkler Used for Fermenting the Soy Nugget

§3.1 Overview of the Sprinkler

In this section, a sprinkler used for producing the tamari soy sauce is explained. More specifically, this sprinkler is used for moisturizing the soy nugget during the fermentation step, which is called kumikake in Japanese.

FIG. 4A shows a schematic diagram of the sprinkler used for moisturizing the soy nugget, called misodama in Japanese, during its fermentation. As shown in this figure, the sprinkler 100 contains vertical elements 110 and horizontal elements 120. The vertical elements 110 contain a rotatable fitting 200, a vertical pipe 300, and branch members 400. The horizontal elements 120 contain a horizontal pipe 500, a supportive pipe 600, coupling members 710-730, and terminal caps 800.

In the sprinkler 100, a liquid first enters the rotatable fitting 200. Then, it goes through the vertical pipe 300 and enters the branch members 400. In the branch members 400, the liquid branches. Some enters the supportive pipe 600 and flows in the supportive pipe 600 in two opposite directions. The rest enters the horizontal pipe 500 and flows in the horizontal pipe 500 in two opposite directions. The liquid flowing in the supportive pipe 600 eventually enters the horizontal pipe 500 through the coupling members 710-730 at several locations. The horizontal pipe 500 contains holes 511-517. Some of the liquid goes out through the holes 511-517. The terminal cap 800 contains an outlet 830. The liquid that has reached the terminal cap 800 goes out through the outlet 830.

While the liquid is discharged from the sprinkler 100, the horizontal elements 120 and some parts of the vertical elements 110 rotate together around the vertical elements 110.

§3.2 Detailed Structure of the Sprinkler

Figure 4B:
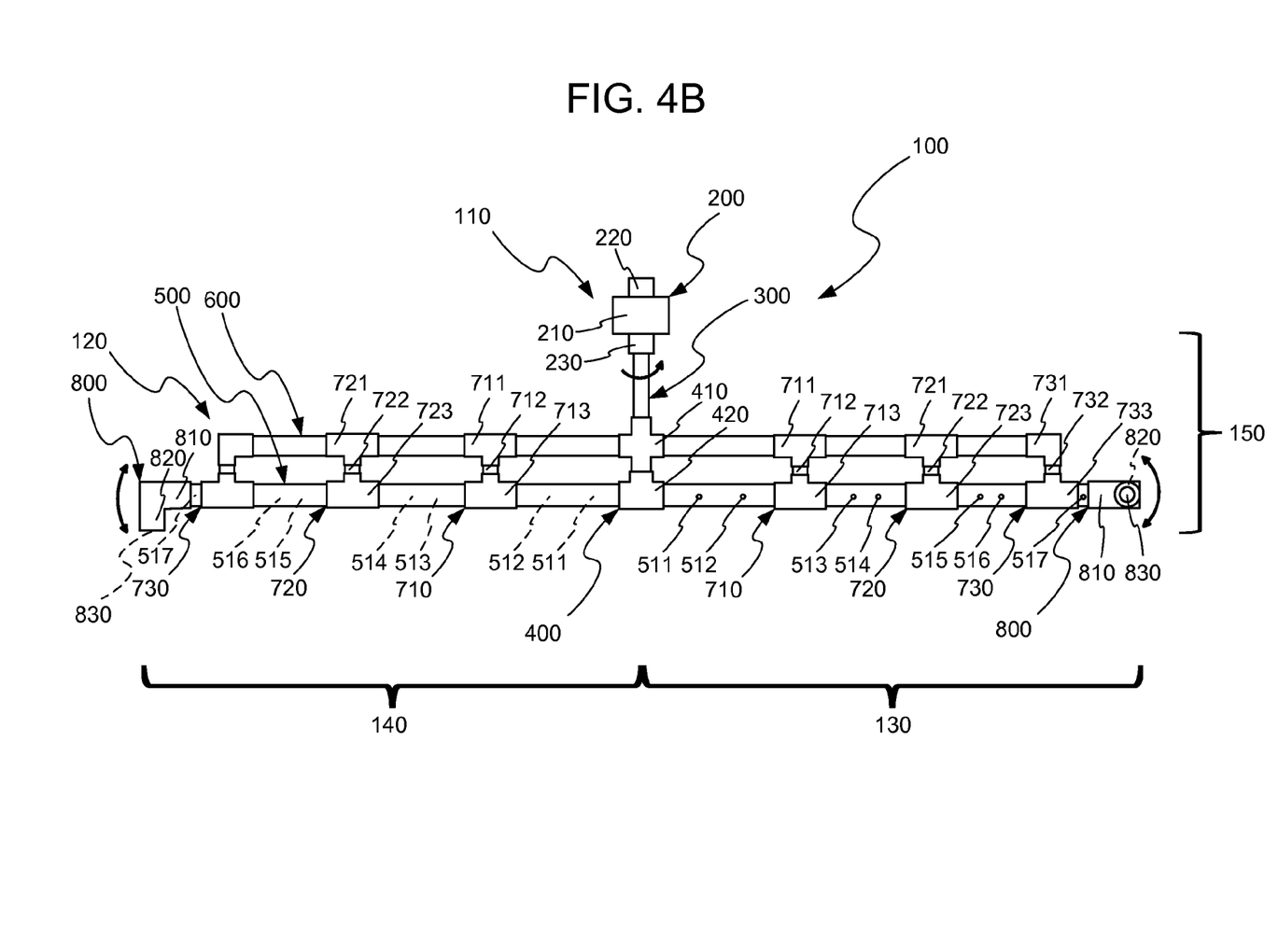

FIG. 4B shows more details of the sprinkler 100. As shown in this figure, the rotatable fitting 200 contains a body 210, a first connector 220 and a second connector 230. The first connector 220 and the second connector 230 are rotatably attached to the body 210 so that they can freely rotate to the body 210 around the longitudinal axes of the connectors, in other words, vertical direction.

One end of the vertical pipe 300 is connected to the second connector 230. The vertical pipe 300 extends in a vertical direction. The other end of the vertical pipe 300 is connected to the branch members 400. The branch members 400 have a shape like '±' and have five openings. The branch members 400 contain a cross-shaped fitting 410 and a T-shaped fitting 420. The other end of the vertical pipe 300 is connected to an upper connector of the cross-shaped fitting 410. The lower connector of the cross-shaped fitting 410 and the upper connector of the T-shaped fitting 420 engage with each other to join the cross-shaped fitting 410 and the T-shaped fitting 420.

The supportive pipe 600 is inserted in and goes through the lateral openings of the cross-shaped fitting 410. Exactly speaking, the cross-shaped fitting 410 is inserted on the supportive pipe 600 and placed at a middle of the supportive pipe 600. By the cross-shaped fitting 410, the supportive pipe 600 is partitioned into two sections, a first half section 130 and a second half section 140.

The horizontal pipe 500 is placed below the supportive pipe 600. Both the horizontal pipe 500 and the supportive pipe 600 extend in a horizontal direction and are arranged in parallel to each other. The horizontal pipe 500 is longer than the supportive pipe 600. The horizontal pipe 500 is inserted in and goes through the lateral openings of the T-shaped fitting 420. Exactly speaking, the T-shaped fitting 420 is inserted on the horizontal pipe 500 and placed at a middle of the horizontal pipe 500. By the T-shaped fitting 420, the horizontal pipe 500 is partitioned into two sections, a first half section 130 and a second half section 140.

On the horizontal pipe 500, the holes 511-517 are formed. The holes 511-517 are aligned in the longitudinal direction of the horizontal pipe 500. Each of the holes 511-517 faces in the horizontal direction that is perpendicular to the longitudinal direction of the horizontal pipe 500. The holes 511-517 provided in the first half section 130 and the holes 511-517 provided in the second half section 140 orient in the opposite directions. In FIG. 4B, the holes 511-517 in the first half section 130 face frontwardly in respect to the horizontal pipe 500, and the holes 511-517 in the second half section 140 face backwardly in respect to the horizontal pipe 500.

The distance between the holes 511-517 generally becomes smaller as the holes 511-517 are located closer to the end of the horizontal pipe 500. For example, the holes 511 and 512 are located closer to the middle of the horizontal pipe 500 than the holes 513 and 514. The distance between the holes 511 and 512 is larger than that between the holes 513 and 514. Likewise, the holes 513 and 514 are located closer to the middle of the horizontal pipe 500 than the holes 515 and 516. The distance between the holes 513 and 514 is larger than that between the holes 515 and 516. More exactly speaking, the holes 511 and 512 are located closer to the middle of the horizontal pipe 500 than the coupling member 710, and the holes 513 and 514 are located farther from the middle of the horizontal pipe 500 than the coupling member 710. The gap between the holes 511 and 512 located closer to the middle of the horizontal pipe 500 than the coupling member 710 is arranged to be larger than the gap between the holes 513 and 514 located farther from the middle of the horizontal pipe 500 than the coupling member 710. Likewise, the holes 513 and 514 are located closer to the middle of the horizontal pipe 500 than the coupling member 720, and the holes 515 and 516 are located farther from the middle of the horizontal pipe 500 than the coupling member 720. The gap between the holes 513 and 514 located closer to the middle of the horizontal pipe 500 than the coupling member 720 is arranged to be larger than the gap between the holes 515 and 516 located farther from the middle of the horizontal pipe 500 than the coupling member 720.

The coupling members 710-730 are provided on both the horizontal pipe 500 and the supportive pipe 600 to bridge the both pipes. The coupling member 710 contains a T-shaped fitting 711, a T-shaped fitting 713, and a bridge pipe 712. The T-shaped fitting 713 is inserted on the horizontal pipe 500, and the T-shaped fitting 711 is inserted on the supportive pipe 600. The T-shaped fitting 713 and the T-shaped fitting 711 are connected by the bridge pipe 712. Likewise, the coupling member 720 contains a T-shaped fitting 721, a T-shaped fitting 723, and a bridge pipe 722. The T-shaped fitting 723 is inserted on the horizontal pipe 500, and the T-shaped fitting 721 is inserted on the supportive pipe 600. The T-shaped fitting 723 and the T-shaped fitting 721 are connected by the bridge pipe 722. The coupling member 730 contains an L-shaped fitting 731, a T-shaped fitting 733, and a bridge pipe 732. The T-shaped fitting 733 is inserted on the horizontal pipe 500. The L-shaped fitting 731 caps the end of the supportive pipe 600. The T-shaped fitting 733 and the L-shaped fitting 731 are connected by the bridge pipe 732. Each of the bridge pipes 712, 722 and 732 forms a fluid path connecting the supportive pipe 600 and the horizontal pipe 500.

The distance between the coupling members 710-730 gradually becomes smaller as the coupling members 710-730 are located closer to the end of the horizontal pipe 500. For example, the distance between the branch members 400 and the coupling member 710 is larger than that between the coupling members 710 and 720. Likewise, the distance between the coupling members 710 and 720 is larger than that between the coupling members 720 and 730.

At the ends of the horizontal pipe 500, the terminal caps 800 are placed. The terminal cap 800 is comprised of an L-shaped fitting and rotatably attached to the horizontal pipe 500 so that it can rotate around the longitudinal axis of the horizontal pipe 500. The terminal cap 800 has two portions, an engaging portion 810 and a protrusion portion 820. The engaging portion 810 rotatably engages with the end of the horizontal pipe 500. The protrusion portion 820 protrudes from the outer circumference of the engaging portion 810. At the end of the protrusion portion 820, an outlet 830 is formed. The diameter of the outlet 830 is larger than the diameter of the holes 511-517. The outlet 830 faces in a circumference direction of the engaging portion 810 and orients perpendicular to the horizontal pipe 500. By the rotation of the terminal cap 800, the outlet 830 can rotate by 360° around the horizontal pipe 500. In other words, the angle of the outlet 830 to the horizontal plane is adjustable by rotating the terminal cap 800. In the case of FIG. 4B, the outlet 830 in the first half section 130 faces frontwardly, and the outlet 830 in the second half section 140 faces downwardly.

The horizontal pipe 500 and the supportive pipe 600 are made of moderately flexible materials. As the flexible material, plastics such as polyvinyl chloride are preferable because they don't rust. As shown in FIG. 5, when the sprinkler 100 is placed for use to sprinkle the liquid, the horizontal pipe 500 and the supportive pipe 600 curve by their weights as well as the weight of the liquid inside of the pipes so that the positions of the end portions of the horizontal pipe 500 and the supportive pipe 600 become lower than the middle portions of the horizontal pipe 500 and the supportive pipe 600. The supportive pipe 600 provides a mechanical support to the horizontal pipe 500 and reinforces the mechanical strength of the horizontal pipe 500. Thereby, the horizontal pipe 500 is prevented from being excessively curved. In one embodiment, the horizontal pipe 500 and the supportive pipe 600 are made of the same material. In other embodiment, the supportive pipe 600 is made of a stiffer material than that of the horizontal pipe 500. The curvature radius of the horizontal pipe 500 can be adjusted by varying the lengths of the bridge pipes 712, 722 and 732. It is preferable that the height difference between the middle and end of the horizontal pipe 500 is configured to be 5-20% of the length between the middle and end of the horizontal pipe 500.

§3.3 Action of the Sprinkler

The supplied liquid enters the rotatable fitting 200 first. Then, it flows through the vertical pipe 300 and enters the branch members 400. The liquid branches in the branch members 400. Some enters the first half section 130 of the supportive pipe 600, and some enters the second half section 140 of the supportive pipe 600. Yet, some enters the first half section 130 of the horizontal pipe 500, and the rest enters the second half section 140 of the horizontal pipe 500.

The liquid that has entered the supportive pipe 600 flows inside of the supportive pipe 600 towards the end of the supportive pipe 600. Some branches and enters the bridge pipe 712, and some branches and enters the bridge pipe 722. The rest reach the end of the supportive pipe 600 and enters the bridge pipe 732. Then, all the liquid that has flown in the supportive pipe 600 eventually enters the horizontal pipe 500 through the bridge pipes 712, 722 and 732.

The liquid that has entered the horizontal pipe 500 from the branch members 400 flows inside of the horizontal pipe 500 towards the end of the horizontal pipe 500. Furthermore, the liquid that has come from the bridge pipes 712, 722 and 732 joins this flow. While the liquid is flowing toward the end of the horizontal pipe 500, some goes out of the horizontal pipe 500 through the holes 511-517. The rest enters the terminal cap 800 and goes out through the outlet 830.

The forces generated by the come-outs of the liquid press the horizontal pipe 500 toward the opposite direction of the flow direction of the liquid. Since the holes 511-517 in the first half section 130 and the second half section 140 orient in the opposite directions, the come-outs of the liquid press the first half section 130 and the second half section 140 of the horizontal pipe 500 in the opposite directions. In the case of FIG. 4B, the come-outs of the liquid press the first half section 130 in the backward direction, and the come-outs of the liquid press the second half section 140 in the frontward direction. Therefore, the rotating members 150, composed of the second connector 230 and the parts below this, rotate counter-clockwise just by the force generated by the flow-out of the liquid. Exactly speaking, in the sprinkler 100, the rotating members 150 are composed of the second connector 230, the vertical pipe 300, the branch members 400, and the horizontal elements 120. And, they coordinately rotate around the longitudinal axis of the vertical elements 110.

The rotational speed of the rotating members 150 is adjusted by changing the angle of the outlet 830 to the horizontal plane. The amount of the liquid coming out of the outlet 830 and the horizontal vector component of the force generated by the come-out of the liquid are varied by changing the angle of the outlet 830. Therefore, the driving force that the liquid flowing out generates is modified and the rotational speed of the sprinkler 100 is adjusted by changing the angle of the outlet 830.

§3.4 Advantage of the Sprinkler

Because the water supply is generally more abundunt in the middle portion of the horizontal pipe 500 than the end portion, the larger amounts of liquid tend to come out of the holes closer to the middle portion than the end portion. However, because of the following configurations of the sprinkler 100, the liquid tends to come out more evenly between the middle portion and the end portion.

First, the supportive pipe 600 and the coupling members 710-730 supply the liquid to the several locations of the horizontal pipe 500 between the middle and end of the horizontal pipe 500. Therefore, some liquid is newly supplied after some of the liquid goes out through the holes 511-516. This prevents the liquid supply to the end portion from being run out.

In addition, the horizontal pipe 500 and the supportive pipe 600 are configured to curve by their and liquid weights so that the end portions of the pipes become lower than the middle portions. This configuration facilitates the liquid flow toward the end portion. Therefore, the larger amount of the liquid can go to the holes closer to the end of the horizontal pipe 500.

Furthermore, because the distance between the coupling member 720 and 730 is smaller than the distance between the branch members 400 and the coupling member 710, in other words, the distance between the coupling members 710-730 generally becomes smaller as they are located closer to the end of the pipes, the larger amounts of the liquid tend to flow into the horizontal pipe 500 in the region closer to its end than closer to its middle. Therefore, sufficient amounts of liquid are supplied to the distal portion of the horizontal pipe 500, preventing the flow-out amount of the liquid through the distal holes from decreasing.

Lastly, because the distances between the holes 511-517 generally become smaller as the holes are located closer to the end of the horizontal pipe 500, the liquid has more chances to go out of the holes near the end of the horizontal pipe 500. This also contributes to evener flow-out of the liquid from segment to segment of the horizontal pipe 500.

§4. Embodiments of the Fermentation Equipment Used for Fermenting the Soy Nugget In this section, equipment used for fermenting the soy nugget is explained.

§4.1 First Embodiment

FIG. 5 shows the schematic diagram of the first embodiment of the fermentation equipment containing the above-explained sprinkler 100. As shown in this figure, the fermentation equipment 900A contains a container 910, a lid 920, the sprinkler 100, an outlet 930A, a pipe 940A, a pump 950, a heating instrument 960A, a thermometer 970, and a controller 980.

The salt water and the soy nuggets N are initially provided in the container 910 that has a cylindrical shape. The top of the container 910 is closed by the lid 920. A hole 921 and an engaging portion 922 are provided at the center of the lid 920. The vertical pipe 300 of the sprinkler 100 is inserted through the hole 921, and the rotatable fitting 200 engages with the engaging portion 922. Thereby, the sprinkler 100 is attached to the lid 920 and hung from the lid 920 so that the sprinkler 100 is located inside the container 910 and above the salt water, which becomes tamari T as time goes by fermentation.

The pipe 940A connects the outlet 930A and the sprinkler 100. In this embodiment, the outlet 930A is provided at a lower position of the inner wall of the container 910, and it orients horizontally. The pump 950 is placed on the pipe 940A. Once the pump 950 is turned on, the raw tamari T, which is a liquid component of fermented product, is intaken from the outlet 930A and pumped to the sprinkler 100 through the pipe 940A. There, the raw tamari T is sprinkled onto the soy nuggets N, which are floating on the raw tamari T. Thereby, the upper portions of the soy nuggets N are kept moisturized for facilitation of the fermentation. Because the sprinkler 100 rotates during sprinkling, the soy nuggets N are widely and evenly moisturized.

The temperature of moromi, which is a mixture of the solid and liquid component of the fermented product, is sensed by the thermometer 970 and monitored by the controller 980. When the temperature is lower than the set temperature, the controller 980 turns on the heating instrument 960A. Thereby, the temperature of the moromi is maintained at the set temperature during the fermentation. One embodiment of the heating instrument 960A is a heater, typical of which is an electric heater. Another embodiment of the heating instrument 960A is a set of heater and heat exchanger, typical of which is a hydronic heating system. In this configuration, the heater is placed apart from the container 910 and the heat exchanger, typically comprised of a heat pipe or a hot-water pipe, is placed on the outer surface of the container 910. These heater and heat exchanger are connected by pipes so that heated water (heat medium) circulates between the heater and the heat exchanger.

§4.2 Second Embodiment

FIG. 6 shows the second embodiment of the fermentation equipment. The difference of the fermentation equipment 900B from the fermentation equipment 900A is a structure of intaking parts of the raw tamari T. As shown in this figure, a cylinder 931B is placed on the inner surface of the container 910 so that it extends in the vertical direction. The bottom end of the cylinder 931B is located near the bottom of the container 910 and forms an inlet 932B for intaking the raw tamari T. An upstream portion of the pipe 940B extends in the vertical direction so that it penetrates the lid 920 and is inserted in the cylinder 931B. The inlet 930B of the pipe 940B is placed inside of the cylinder 931B and above the inlet 932B. Thereby, a large solid component of the fermented product is well prevented from entering the inlet 930B.

§4.3 Third Embodiment

FIG. 7 shows the third embodiment of the fermentation equipment. One difference of the fermentation equipment 900C from the fermentation equipment 900A is a structure of pouring the raw tamari T to the soy nuggets N. As shown in this figure, a shower head 941C is provided at the downstream end of the pipe 940C. The shower head 941C is located above the soy nuggets N and right below the lid 920. The tamari T is supplied to the shower head 941C through the pipe 940C by the pump 950. And, the shower head 941C showers the tamari T onto the soy nuggets N.

The other difference is that the fermentation equipment 900C contains a bubbling system 990, which provides bubbles in the tamari T. The bubbling system 990 contains an air pump 991 and an air pipe 992. The air pipe 992 runs in a horizontal direction in the bottom of the container 910. The air pump 919 is provided at one end of the air pipe 992. The air pump 991 pumps air into the air pipe 992. And, the air runs through the air pipe 992. The air pipe 992 contains holes in the region inside of the container 910. The air comes out of the air pipe 992 through the holes. Thereby, the bubbles are provided in the tamari T.

While the principles of the disclosure have been described above in connection with specific apparatuses and methods, it is to be clearly understood that this description is made only by way of example and not as limitation on the scope of the invention.

The invention claimed is:

1. A sprinkler used for producing tamari soy sauce to moisturize a soy nugget with raw tamari during its fermentation, the sprinkler comprising:
   a vertical pipe, which extends in a vertical direction;
   a branch member, to which a lower end of the vertical pipe is coupled;
   a horizontal pipe, which goes through the branch member, and which extends in a horizontal direction; and
   wherein the horizontal pipe comprises a plurality of holes, which align in a longitudinal direction of the horizontal pipe, and which face in a horizontal direction;
   wherein the branch member partitions the horizontal pipe into a first half section and a second half section, and the holes provided on the first half section and the holes provided on the second half section face in the opposite directions; and
   wherein raw tamari is configured to come out of the sprinkler through the holes, and the horizontal pipe is configured to rotate around the vertical pipe by a force generated by the sprinkling of the raw tamari.

2. The sprinkler of claim 1, further comprising:
   a supportive pipe, which also goes through the branch member, and which extends in a horizontal direction in parallel to the horizontal pipe; and
   a plurality of coupling members, which couple to the supportive pipe and the horizontal pipe;
   wherein each of the coupling members connects the supportive pipe and the horizontal pipe, and the raw tamari flows inside the horizontal pipe.

3. The sprinkler of claim 2, wherein the coupling members comprise a first coupling member, a second coupling member and a third coupling member, where the first coupling member is located closer to the vertical pipe than the second coupling member, and the second coupling member is located closer to the vertical pipe than the third coupling member; wherein the distance between the vertical pipe and the first coupling member is larger than the distance between the second coupling member and the third coupling member.

4. The sprinkler of claim 1, further comprising a terminal cap, which is attached to an end of the horizontal pipe; wherein the terminal cap comprises an outlet for the raw tamari, where the diameter of the outlet is larger than that of the holes provided on the horizontal pipe; and wherein the terminal cap is rotatable around the horizontal pipe so that the orientation of the outlet can be adjusted.

5. The sprinkler of claim 4, wherein the terminal cap further comprises:
   an engaging portion, which rotatably engages with the end of the horizontal pipe; and a protrusion portion, which protrudes from an outer circumference of the engaging portion;
   wherein the protrusion forms the outlet.

6. The sprinkler of claim 1, wherein the distance between the holes generally becomes smaller as the positions of the holes locate closer to the end of the horizontal pipe.

7. The sprinkler of claim 1, wherein the horizontal pipe is made of a flexible material so that the horizontal pipe forms a curve such that an end of the horizontal pipe is located lower than a middle of the horizontal Pipe.

* * * * *